(12) United States Patent
Minea et al.

(10) Patent No.: US 7,945,966 B2
(45) Date of Patent: May 17, 2011

(54) NANOMETRIC EMITTER/RECEIVER GUIDES

(76) Inventors: Tiberiu Minea, Paris (FR); Guy Louarn, Nantes (FR); Guirec Ollivier, Nantes (FR); Marc Chaigneau, Paris (FR)

( * ) Notice: Subject to any disclaimer, the term of this patent is extended or adjusted under 35 U.S.C. 154(b) by 484 days.

(21) Appl. No.: 11/916,647

(22) PCT Filed: Jun. 6, 2006

(86) PCT No.: PCT/FR2006/001279
§ 371 (c)(1),
(2), (4) Date: May 16, 2008

(87) PCT Pub. No.: WO2006/131639
PCT Pub. Date: Dec. 14, 2006

(65) Prior Publication Data
US 2009/0172846 A1 Jul. 2, 2009

(30) Foreign Application Priority Data
Jun. 6, 2005 (FR) ..................... 05 05706

(51) Int. Cl.
G01Q 70/00 (2010.01)
G01Q 70/10 (2010.01)
G01Q 70/16 (2010.01)

(52) U.S. Cl. ............... 850/60; 850/52; 850/56; 850/57; 850/59; 977/840; 977/849; 977/860; 977/947

(58) Field of Classification Search ............ 850/52, 850/53, 55, 56, 57, 58, 59, 30, 31, 32; 977/840, 977/842, 849, 850, 860, 861, 862, 863, 874, 947

See application file for complete search history.

(56) References Cited

U.S. PATENT DOCUMENTS

| 5,272,330 A | 12/1993 | Betzig et al. |
| 6,947,311 B2* | 9/2005 | Berner et al. ............... 365/151 |
| 2003/0010911 A1* | 1/2003 | Palmer et al. ............... 250/306 |
| 2003/0094035 A1* | 5/2003 | Mitchell ..................... 73/105 |

FOREIGN PATENT DOCUMENTS

EP 1 408 327 A2 4/2004

OTHER PUBLICATIONS

EPO International Search Report re PCT/FR2006/001279, completed Sep. 21, 2006, mailed Sep. 28, 2006.
R. Stockle, et al., "High-Quality Near-Field Optical Probes by Tube Etching," Applied Physics Letters, American Institute of Physics, Jul. 12, 1999, vol. 75, No. 2, pp. 160-162.
N. Kumar, et al., "Summary Abstract: Aluminum Deposition on Optical Fibers by a Hollow Cathode Magnetron Sputtering System," Journal of Vacuum Science & Technology, May 1988, vol. 6, No. 3, pp. 1772-1774.
R.C. Dunn, "Near-Field Scanning Optical Microsopy," Chemical Reviews, 1999, vol. 99, No. 10, pp. 2891-2927.

* cited by examiner

Primary Examiner — David A Vanore
Assistant Examiner — Nicole Ippolito Rausch
(74) Attorney, Agent, or Firm — Duane Morris LLP

(57) ABSTRACT

The invention relates to a nanoprobe comprising a silica fiber (2) with an end opening having a diameter of less than 100 nm, and a metallic sheath (11). The total diameter of the silica part and the metallic sheath (11) is less than 300 nm. The invention also relates to a method for producing one such nanoprobe.

13 Claims, 5 Drawing Sheets

NANOMETRIC EMITTER/RECEIVER GUIDES

The invention relates to optical guides with nanometric dimensions for the near field microscopic analysis such as the SNOM, (Scanning Near-Field Optical Microscopy), PSTM (Photon Scanning Tunneling Microscopy) or AFM (Atomic Force Microscopy) or the sub-micronic recording on photosensitive materials and a method for producing such guides.

Such guides are also known under the name of "nanoprobes".

Various methods for manufacturing such nanoprobes are known.

In particular, U.S. Pat. No. 5,272,330, "Near Field scanning optical microscope having a tapered waveguide" proposes the use of a single-mode optical fibre comprising a 3 pm diameter core, tapered via local heating and stretching, then metallised via vacuum thermal evaporation. The aperture of the tip, i.e. the non-metallised area is produced inside the frame via a shadowing effect in relation to the directional flow of metal (aluminium), having an inside diameter smaller to the wavelength.

In said document, a type of probe required for implementing a near field microscopy method is described. However, said document does not indicate how such probes may be produced by the person skilled in the art.

More generally, the manufacturing of one such nanometric dimension probe comprises a plurality of steps from a silica optical fibre, of which a step for producing the tip via etching, a metallisation step, and optionally a step for producing the nano-aperture, as illustrated generally in FIG. 1.

Starting for example from a silica optical fibre comprising a mechanical protective sheath, a chemical attack on the fibre is produced in a manner known per se. According to prior art for example described in the Steickle and al. publication Applied Physics Letter 75(2) 1999, 160, said attack is produced using the source mechanical sheath of the fibre.

Following the etching, it is therefore necessary to strip the fibre of the sheath thereof, which causes a fairly high risk of breakage, which is incompatible with an efficient industrial production of such nanoprobes.

According to an advantage of the present invention, the risk of breakage is therefore reduced during the etching step, while maintaining a good spatial and optical resolution and a good manufacturing yield.

Moreover, following the chemical etching, and before metallisation, it is important that the tip obtained is perfectly clean, and does not comprise a rough profile, due to attachment of dust for example, that may compromise the surface state of the tip obtained.

Another advantage of the present invention is therefore preferably to carry out said cleaning in an efficient and reproducible manner.

In addition, the metallisation steps known by prior art generally use either thermal evaporation or via a vacuum electron beam, or the spraying of targets bombarded by a beam of ions or a plasma. Said targets all have however the particularity of being flat geometry targets which require the rotation of the fibre in order to provide a good homogeneity of the metallic film around the fibre.

One aim of the present invention is therefore to prevent the rotation of the fibre during the metallisation step, while maintaining a uniform deposit on the latter.

Finally, during the step for producing the nano-aperture, when the latter is necessary, it is important to limit the risks of breakage of the fibre that the methods known from the prior art present such as scraping, solid electrolyte or the Joule effect.

The present invention aims to overcome the abovementioned disadvantages.

To this end, the invention relates to a method for manufacturing a nanoprobe, from a silica optical fibre comprising the steps consisting of:
  plunging the end comprising said optical fibre into a chemical medium intended for etching in order to obtain a silica cone
  depositing an opaque film made of a conductive material, on said silica cone of the fibre,
characterised in that said deposit comprises sub-steps consisting of:
  placing said fibre on the axis of a substantially cylindrical hollow cathode, said cathode consisting of said conductive material;
  spraying said conductive material on said silica cone with the aid of a plasma in order to obtain said opaque film.

In this way, by using a cathode with cylindrical symmetry, the rotation of the fibre is avoided during the metallisation step, while maintaining a uniform deposit on the latter.

Optionally, the deposit of the opaque film is assisted by a variable magnetic field in order to make the plasma denser and vary the properties of the deposit.

Moreover, in order to improve the surface state of the tip of the optical fibre, in particular in view of later metallisation steps, the abovementioned method may comprise, following the etching in order to obtain a silica cone, and prior to the deposit of said opaque film, a cleaning step consisting of:
  placing said fibre on the axis of said hollow cathode;
  generating a beam of electrons in said hollow cathode such as to clean said silica cone.

Preferably, said opaque film is formed of metal or a metallic compound.

Such metallic films deposited on a fibre—cylindrical or tapered—are also known under the name of "metallic sheath".

In the case of producing aperture nanoprobes, and in order to minimise the risk of breakage during the production of the aperture, following the deposit of said sheath, a step is carried out consisting of producing a flat-tip filamentary discharge between the end of said cone covered with said sheath, and a substantially flat surface for obtaining an aperture at the end of said cone.

It is understood that said step for producing the aperture may be used combined with the above-described features of the invention, but also as such, following a known metallisation and etching method, in the case of the manufacturing of an aperture nanoprobe.

Moreover, in the case where said optical fibre is initially covered with a mechanical protective sheath, the method according to the invention preferably comprises the preliminary steps consisting of:
  removing said mechanical sheath at one end of said optical fibre up to the optical sheath;
  creating a new sheath at the level of the stripped end of said fibre, said new sheath consisting of a material that does not adhere to silica;
  then, following the etching step, said new sheath is removed.

The use of a non-adherent material also enables the risks of breakage to be reduced when the silica is removed.

The invention also relates to a silica nanoprobe the end aperture of which having a diameter of less than 100 nm, preferably less than 50 nm, and, a metallic sheath, the total diameter of the silica part and of said metallic sheath being less than 300 nm.

One such nanoprobe may in particular be produced via the abovementioned method.

The invention is best understood from the following description, provided merely for the purpose of explanation of one embodiment of the invention, in reference to the appended figures.

Figure 1:
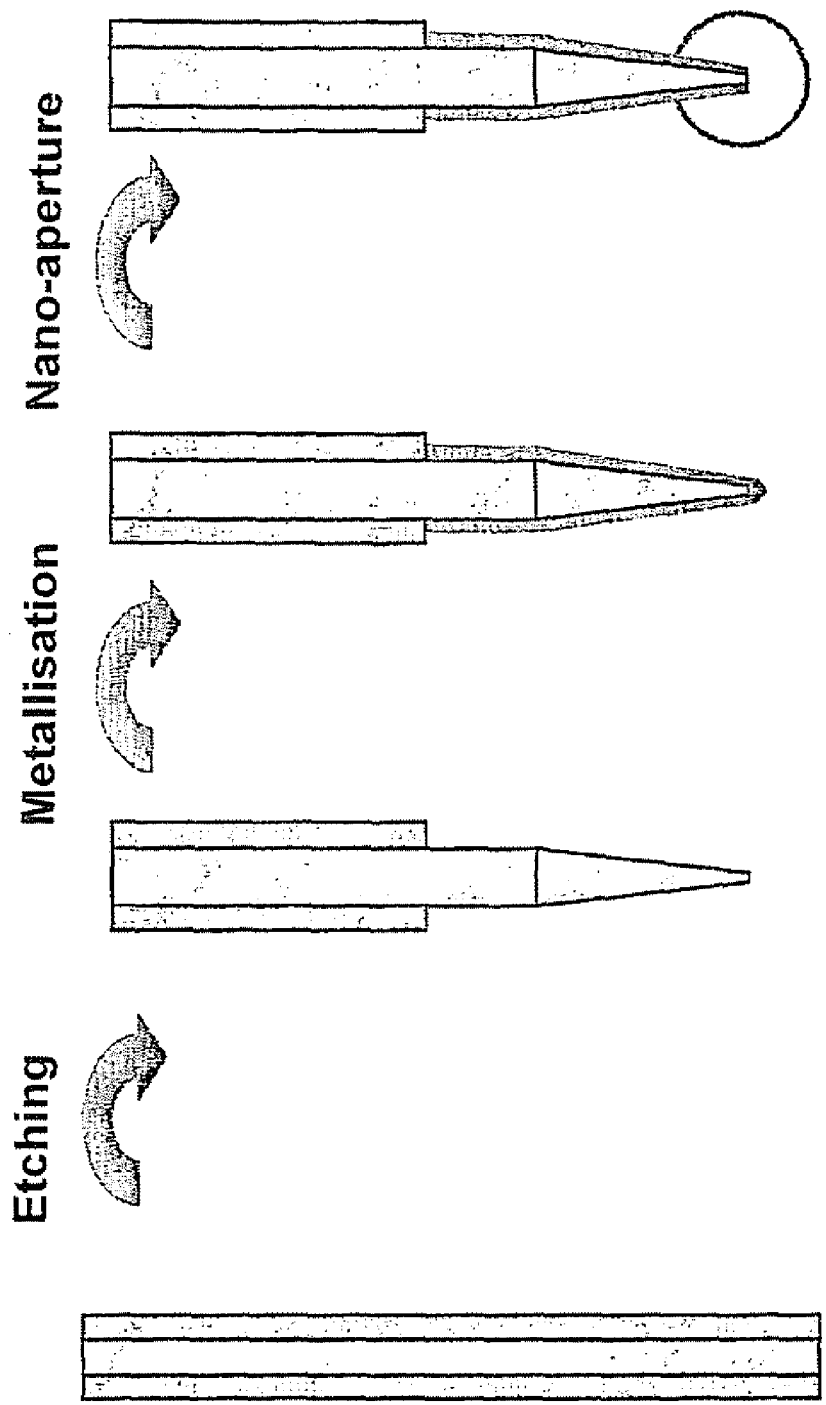
FIG. 1 illustrates generally and known per se the method for manufacturing a nanoprobe from an optical fibre.
Figure 2:
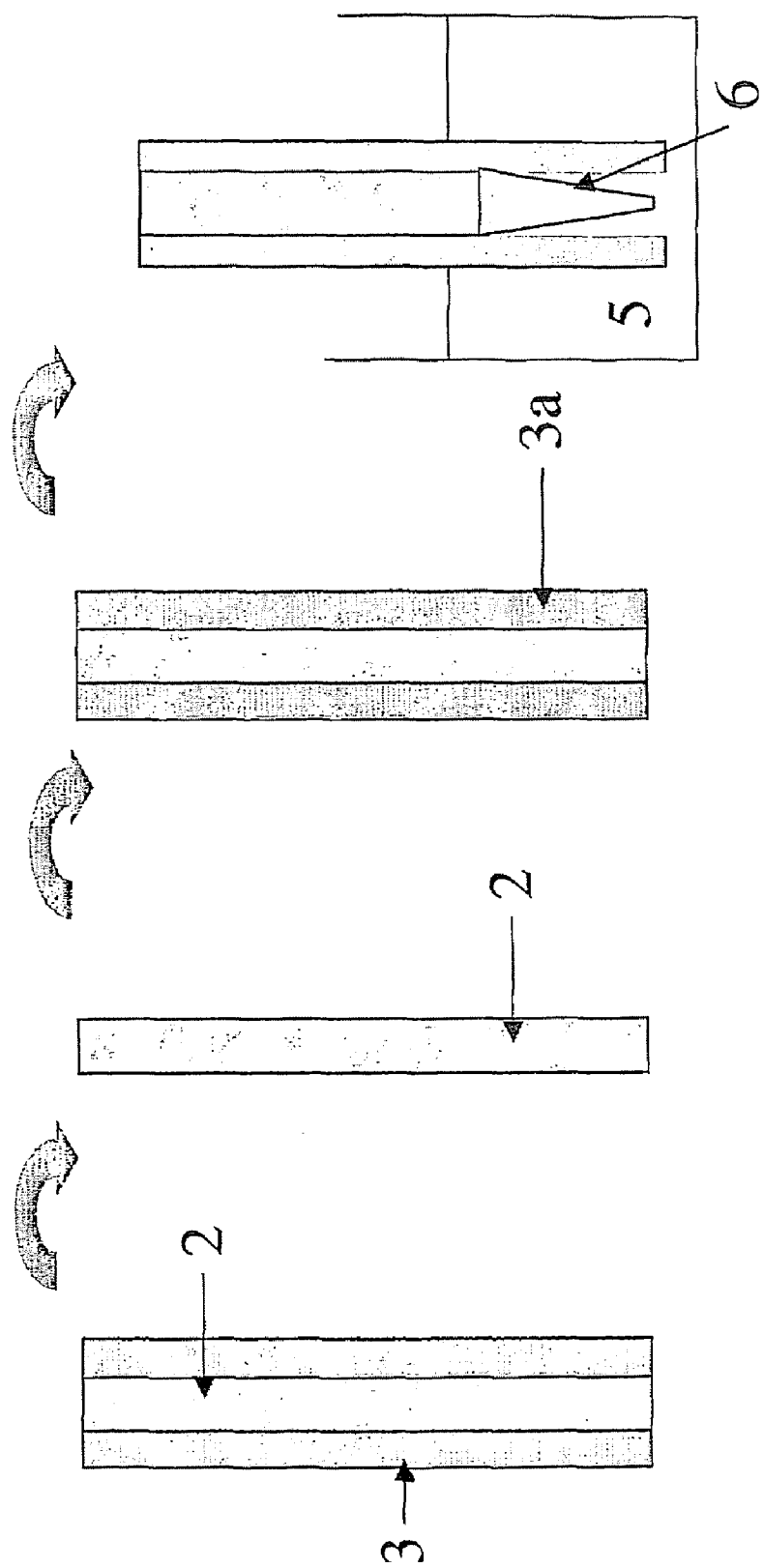
FIG. 2 illustrates the etching method according to the invention via application of a non-adherent sheath.
Figure 3:
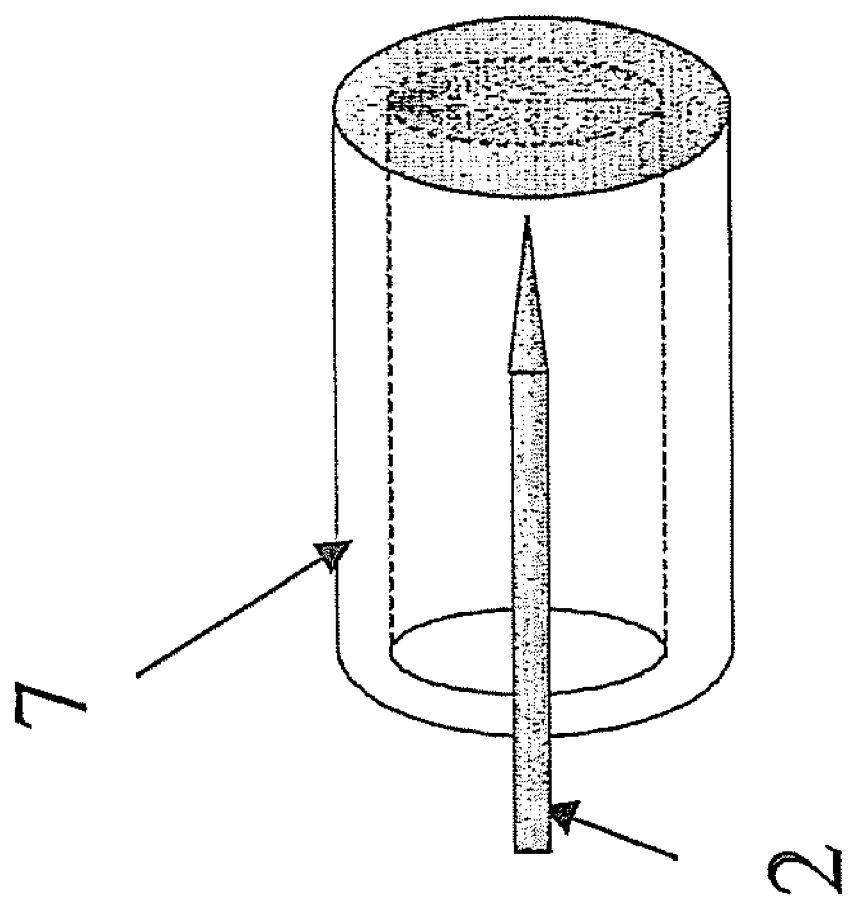
FIG. 3 illustrates the insertion of the fibre in a metallic cathode for cleaning and followed by the metallisation via plasma spraying.
Figure 4:
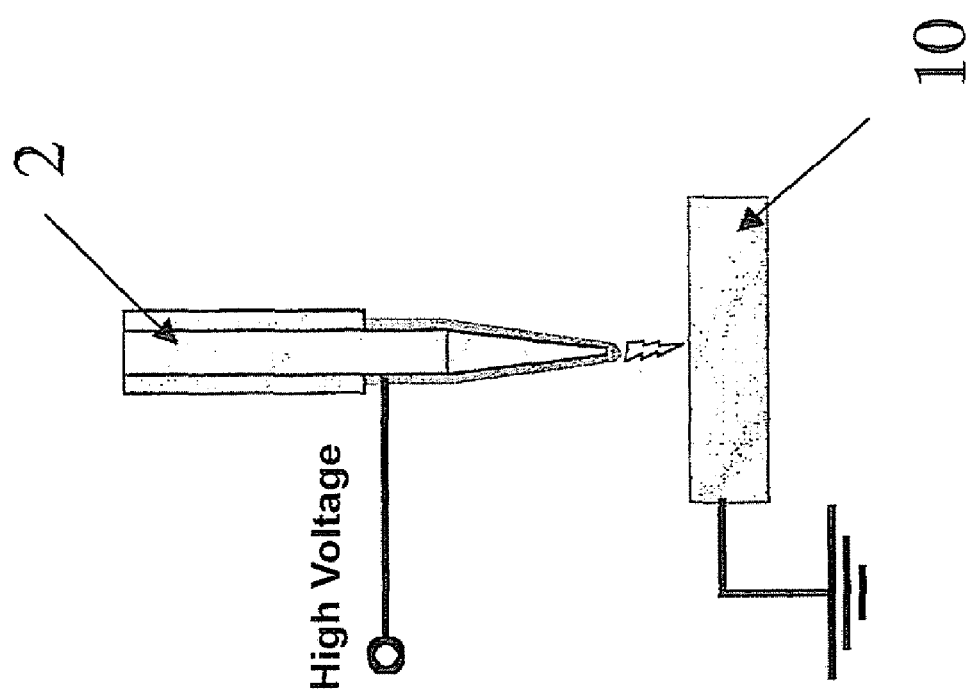
FIG. 4 illustrates an example of step for creating the nano-aperture according to the present invention via flat-tip filamentary discharge.

According to the invention, illustrated in FIG. 2, said method starts with a source optical fibre consisting of a silica core, and an optical sheath also made of silica, the silica assembly being noted as 2. Said fibre is optionally surrounded by a mechanical protective sheath 3. In this case, the sheath 3 is first removed by means known per se, either mechanically with the aid of a clamp, or thermally, by making the sheath 3 melt, in order to obtain a stripped silica fibre 2.

According to an aspect of the invention, before the etching step, a sheath 3a is then replaced around the silica fibre 2. Said sheath 3a is preferably non-adherent, for example made of wax, such that the later elimination thereof is damageless for the end of the fibre. The risk of breakage is therefore advantageously minimised.

The chemical etching of the silica fibre 2 is then carried out by inserting the entire fibre 2, including the new sheath 3a into a hydrofluoric acid bath 5 (HF bath). It is therefore known that the contact of the two separate materials (silica and material of the sheath) creates convection currents and favours the chemical attack via the outside of the silica, in order to thus create a conical-shaped end 6.

Surprisingly, it is also noted that the presence of a wax sheath 3a enables the undesired attack by the acid vapour to be avoided during the etching. Indeed, the wax being impervious to the acid, it prevents the latter from attacking the silica fibre 2 well beyond the immerged area. The problem of the creation an HF acid vapour is known to the person skilled in the art, which up to then introduced a layer of oily matter on top of the acid. The positioning of the non-adherent material sheath 3a enables the introduction of a protective layer of oil to be avoided and therefore simplifies the etching method.

Said etching step enables a diameter of less than 80 nm to be obtained at the level of the end 6 of the fibre, for an angle of the cone at the apex between 15° and 20°.

Once the tip 6 obtained, and the sheath 3a removed at the level of the end 6 of the fibre, preferably a step for cleaning said end is carried out. Said cleaning step enables the work in clean room to be avoided during the operations for manufacturing the nanoprobe. Indeed, it is understood that the possible attachment of dust on the tip reduces the quality of the surface state thereof, and therefore negatively modifies the optical properties of the probe.

Said cleaning is carried out by exposure to a beam of electrons. Indeed, the surface of the tip and the dust become negatively charged by exposure said beam, and the Columbian repulsion is sufficient for overcoming the weak Van der Waals bonds between the dust and the silica surface of the tip 6.

In this way, the micronic or sub-micronic size dust is cleared, thus avoiding the work in clean room, and therefore the cost of manufacturing the nanoprobe is decreased. It will be noted that said step is perfectly reproducible and damageless on the tip 6.

The following step is a step for depositing a conductive layer on the end of the tip, commonly known as metallisation step.

In said step a device 7 specifically designed for enabling the uniform and homogeneous deposit around the point is used, while eliminating the rotation thereof during the operation.

For this purpose, a cylindrical hollow cathode is used, inside of which may be positioned the tip to be metallised. The person skilled in the art will understand that as the solid angle occupied by the end of the fibre in relation to the target is very small (for example in the order of $10^{-4}$ steradians), a large quantity of sprayed metal passes to the side of the fibre. In the case of a flat target such as same known from the prior art, all of said metal is lost. Conversely, the substantially cylindrical shape of the cathode according to the invention enables the metal which has not reached the fibre to be reused. It will also be understood that the cylindrical hollow cathode enables rotation of the fibre during the metallisation to be prevented.

It is possible to have available according to said device, a wide range of metals, for example Ag, Au, Al, Pt, or Cr. However, the deposit is not limited to metals, and any material which is on one hand opaque, for optical reasons, and on the other hand conductive, due to the filamentary discharge used thereafter, may be used. Metals or metallic compounds are preferably used.

It will also be understood that advantageously, the hollow cathode used for the metallisation step may also be used for the previously described cleaning via plasma treatment step. In this way, the steps may simply follow on, for a simple method to be implemented.

Following said metallisation step, the nanoprobe according to the invention is entirely covered with a metal and can be used directly in apertureless mode, for applications such as the AFM in 'shear force' mode or the apertureless SNOM (ASNOM—"Apertureless Scanning nearfield Optical Microscopy").

The thickness of the metallic deposit by the method according to the invention is typically less than 50 nm.

The last step for manufacturing the nanoprobe according to the invention is the creation of the nano-aperture. To this end, a high voltage micro-discharge is produced in flat-tip geometry. Said method has the advantage of avoiding the contact between the tip and a surface, thus minimising the risks of breakage. The end aperture obtained by said method is therefore less than 100 nm, and, may preferably be less than 50 nm. Via tip effect at the level of the end of the fibre, the electrical field obtained is indeed very intense such that it enables a certain quantity of metal to be removed at the level of the tip by preferably channelling to said location the ions of the discharge. The duration of the micro-discharge therefore enables the quantity of metal removed to be controlled. The plane 10 is also chosen so as to produce a suitable flat-tip filamentary discharge. The person skilled in the art is capable of determining the features of said plane. In particular, the radius of curvature of the plane 10 must be much greater than that of the tip in order to obtain the effect of increasing the electrical field.

The voltage typically applied is in the order of 1 kV continuously during a short period, for example one second, or via the application of a plurality of successive high voltage impulsions (in the order of the kV) until the desired nano-aperture is obtained.

Finally, it is understood that in order to produce the microdischarge according to the invention with the best efficiency, it is advisable to work under vacuum or under controlled atmosphere.

Figure 5:
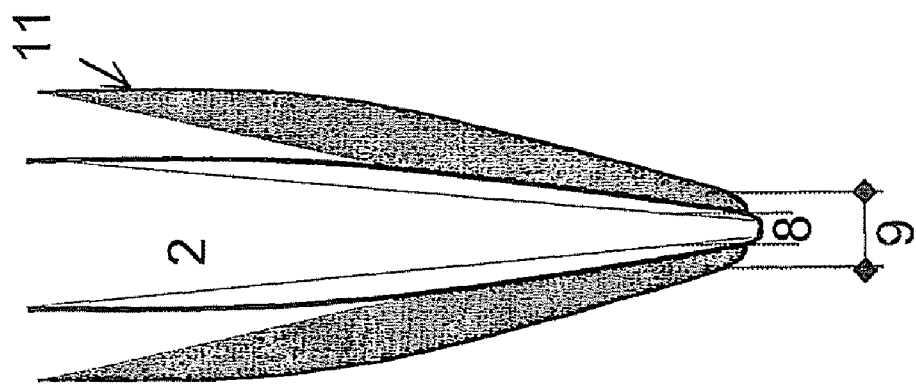
FIG. 5 illustrates an example of nanoprobe obtained by the manufacturing method according to the invention.

The nanoprobe obtained according to the method described in the present invention therefore has the following features with reference to FIG. 5: the diameter of the silica fibre is in the order of 125 μm, the diameter 9 of the covered tip is between 100 and 200 nm, and, the aperture 8 has a nanometric diameter between 30 and 60 nm.

In this way, a nanoprobe is obtained comprising a silica fibre 2 the end aperture 8 of which has a diameter of less than 100 nm, and, a metallic sheath 11, the total diameter of the silica fibre and of said metallic sheath 11 being less than 300 nm.

Preferably, the end aperture 8 itself has a diameter of less than 50 nm.

The invention is described in that which precedes by way of example. It is understood that the person skilled in the art is able to produce various variants of the invention without in as much deviating from the scope of the patent.

The invention claimed is:

1. A method for manufacturing a nanoprobe from a silica optical fibre, the method comprising:
    plunging an end of said silica optical fibre into a chemical medium intended for etching in order to obtain a silica cone;
    cleaning said silica cone, wherein said cleaning comprising sub-steps of:
        placing said optical fibre on the axis of a substantially cylindrical hollow cathode, and
        generating a beam of electrons in said hollow cathode;
    depositing an opaque film made of a conductive material, on said silica cone of the silica optical fibre, wherein the steps of depositing the opaque film comprises sub-steps of:
        placing said silica optical fibre on an axis of said substantially cylindrical hollow cathode, wherein said cathode comprises the conductive material; and
        spraying said conductive material on said silica cone with the aid of a plasma in order to obtain said opaque film; and
    following the depositing of the opaque film, producing said aperture at the end of said silica cone, wherein said aperture is produced by a flat-tip filamentary discharge between the end of said silica cone covered with said metallic sheath and a substantially flat surface in order to obtain said aperture at the end of said silica cone,
    wherein said nanoprobe comprises said silica optical fibre having an end aperture with a diameter of less than 100 nm, and a metallic sheath, wherein the total diameter of said silica optical fibre and of said metallic sheath is less than 300 nm.

2. The method according to claim 1, further comprising initially covering the silica optical fibre with a mechanical protective sheath, wherein the step of initially covering the silica optical fibre comprises the preliminary steps:
    removing said mechanical sheath at one end of said silica optical fibre up to the optical sheath;
    creating a new sheath at the level of the stripped end of said silica optical fibre, wherein said new sheath comprises a material that does not adhere to silica; and
    following the etching step, removing said new sheath.

3. The method according to claim 2, wherein said conductive opaque film is made of metal or a metallic compound.

4. The method according to claim 2, wherein said step for depositing said sheath is completed by the application of a variable magnetic field.

5. The method according to claim 1, wherein said opaque film is made of metal or metallic compound.

6. The method according to claim 5, wherein said step for depositing said sheath is completed by the application of a variable magnetic field.

7. The method according to claim 5, wherein said step for depositing said sheath is completed by the application of a variable magnetic field.

8. The method according to claim 1, wherein the step of depositing said sheath is completed by the application of a variable magnetic field.

9. The method according to claim 1, further comprising initially covering the silica optical fibre with a mechanical protective sheath, wherein the step of initially covering the silica optical fibre comprises the preliminary steps:
    removing said mechanical sheath at one end of said silica optical fibre up to the optical sheath;
    creating a new sheath at the level of the stripped end of said silica optical fibre, wherein said new sheath comprises a material that does not adhere to silica; and
    following the etching step, removing said new sheath.

10. The method according to claim 1, further comprising initially covering the silica optical fibre with a mechanical protective sheath, wherein the step of initially covering the silica optical fibre comprises the preliminary steps:
    removing said mechanical sheath at one end of said silica optical fibre up to the optical sheath;
    creating a new sheath at the level of the stripped end of said silica optical fibre, wherein said new sheath comprises a material that does not adhere to silica; and
    following the etching step, removing said new sheath.

11. The method according to claim 1, wherein said conductive opaque film is made of metal or a metallic compound.

12. The method according to claim 1, wherein said conductive opaque film is made of metal or a metallic compound.

13. The method according to claim 1, wherein said step for depositing said sheath is completed by the application of a variable magnetic field.

* * * * *